Aug. 19, 1941.   W. C. McANLIS   2,252,812
COMBINED GARBAGE RECEPTACLE AND RAT TRAP
Filed Feb. 17, 1940
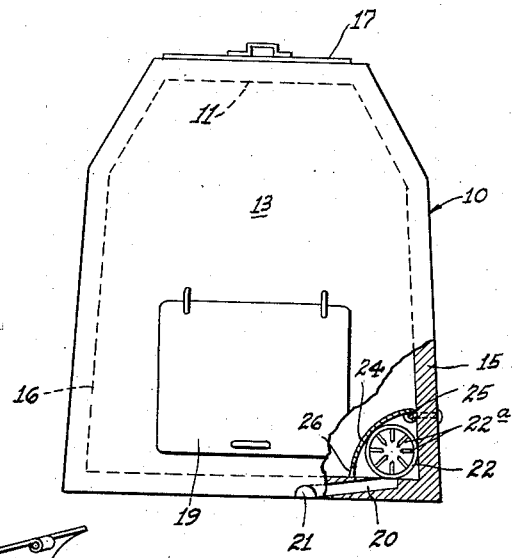
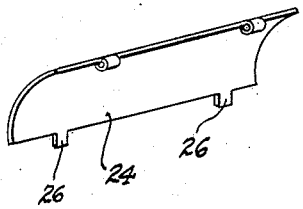
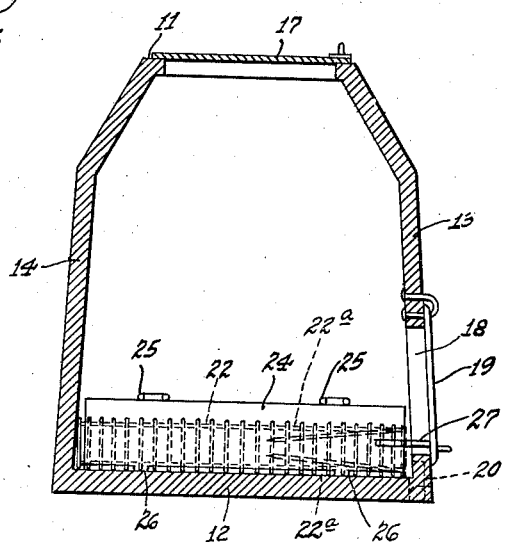
Inventor
WALLACE C. McANLIS.
By
Attorneys Patented Aug. 19, 1941

2,252,812

UNITED STATES PATENT OFFICE 2,252,812

COMBINED GARBAGE RECEPTACLE AND RAT TRAP

Wallace C. McAnlis, Detroit, Mich.

Application February 17, 1940, Serial No. 319,389

4 Claims. (Cl. 43—65)

This invention relates generally to a combined garbage receptacle and rat trap.

As is well known, rats in addition to carrying germs and being generally obnoxious cause considerable property damage, particularly in large cities. The extermination of rats or even prevention of increase in numbers of rats has become quite a problem particularly in old sections of cities and usually they can be found in large numbers in alleys back of grocery stores and restaurants where they feed on the refuse in garbage receptacles.

It is an object of the present invention to provide an ever baited combined garbage receptacle and rat trap wherein large numbers of rats can be caught and periodically removed for destruction.

Other objects of the invention will appear from the following detailed description taken with the accompanying drawing in which:

Figure 1 is a front view partly broken away and in section of a combined garbage receptacle and rat trap;

Fig. 2 is a vertical sectional view of the receptacle;

Fig. 3 is a perspective view of a shield member for the trap.

Referring to the drawing by characters of reference, the numeral 10 designates in general a garbage receptacle which may be of any suitable type, the present receptacle being made of concrete and having a top wall 11, bottom wall 12, a front wall 13, a rear wall 14, and side walls 15 and 16. In the top wall 11 is an opening for dumping garbage into the receptacle, the said opening being closable by a cover plate 17 which may be suitably pivoted or hinged to the receptacle wall 11. In the front wall of the receptacle 10 is a cleanout opening 18 which is normally closed by a door 19 which may be suitably pivoted or hinged to the receptacle front wall 13.

A passage 20 leading into the receptacle 10 through the receptacle bottom wall 12 is provided with an inlet opening 21 which is preferably located in the front wall of the receptacle below the clean out door where rats are most likely to go in search of refuse. The passage 20 opens into the receptacle 10 through the bottom wall 12 and leads into the open end of a rat trap 22 which seats on the bottom wall 12 adjacent the side wall 15. These traps are well known devices which are usually made of wire in the form of an elongated cage wherein a plurality of spaced longitudinally extending rods 22ª are provided having their inner ends pointed and closer together than their outer ends to permit entrance of rats to the cage but prevent their return or escape. The trap 22 may be made to extend from the front wall to the rear wall of the receptacle and may be removable through the clean out door opening 18.

Overlying the rat trap 22, is a shield 24 which serves to take the load of the garbage off the trap and also prevents the trap from becoming filled with garbage. This shield 24 may be pivoted at its upper edge, as at 25, in any suitable manner to the receptacle side wall 15, the lower edge of the shield 24 preferably having extensions or feet 26 to space the lower edge of the shield from the bottom wall of the receptacle. On the inner side of the clean out door 19 is a projection 27 which when the door is closed engages the shield 24 to prevent unauthorized persons from tampering with the trap through the top door opening, the clean out door 19 preferably being provided with a padlock (not shown).

From the foregoing description it will be seen that rats seeking refuse at the garbage receptacle will most likely enter the opening 21 in the receptacle front wall and enter the trap 22 through the passage 20. Combined garbage receptacles and rat traps located in rat infested neighborhoods will serve to materially reduce the number of rats, and it will be appreciated that the traps will always be baited and will require little or no attention. When the garbage collectors collect the garbage they could also collect the rats, it only being necessary to raise the shield 24 and remove the trap through the clean out opening 18.

While I have shown and described my invention in detail it is to be understood that the same is to be limited only by the appended claims for many changes may be made without departing from the spirit and scope of the invention.

What I claim is:

1. In combination, a garbage receptacle having an opening in a wall thereof leading into the receptacle, a rat trap within the receptacle and having an inlet communicating with the opening in the wall of the receptacle and a shield member overlying said trap.

2. In combination, a garbage receptacle having an opening through a wall thereof leading from outside into the receptacle, a wire cage trap within said receptacle and having an inlet registering with said opening, and a shield member overlying said trap, to support the garbage and prevent the same from filling the trap.

3. In combination, a garbage receptacle having a passage leading from outside of the receptacle through a wall thereof into the receptacle, a wire cage trap within the receptacle and having an inlet registering with said passage, and a shield member pivoted to the receptacle therewithin and overlying said trap.

4. In combination, a garbage receptacle having a passage leading from outside of the receptacle thereinto, said receptacle having an opening in a wall thereof normally closed by a door, a wire cage rat trap disposed within the receptacle laterally of said door opening, and a shield member within said receptacle and overlying said trap to support the garbage, said shield member being pivoted to a wall of the receptacle and arranged to be swung upward to remove said trap, and means carried by said door for holding said shield down when the door is closed.

WALLACE C. McANLIS.